(No Model.)

J. D. PRICE.
CHART.

No. 480,413. Patented Aug. 9, 1892.

Witnesses:

Inventor:
Jonathan D. Price,

UNITED STATES PATENT OFFICE.

JONATHAN D. PRICE, OF CHICAGO, ILLINOIS.

CHART.

SPECIFICATION forming part of Letters Patent No. 480,413, dated August 9, 1892.

Application filed December 21, 1891. Serial No. 415,741. (No model.)

*To all whom it may concern:*

Be it known that I, JONATHAN D. PRICE, a citizen of the United States, residing at Chicago, in the county of Cook and State of Illinois, have invented a new and useful Improvement in Charts, of which the following is a specification.

My invention relates to an improvement in the class of apparatus for demonstrating the earth's surface or any portion thereof or terrestrial and celestial objects, all of which are intended to be included within the titular term I employ to designate my invention, whether the chart be in flat or in globular or fractionally-globular or other form.

The object of my improvement is to provide at desired points on charts and observable through lenses, as of the magnifying variety, affixed thereto representations or views in some way associated with the locality, of events, scenery, indigenous objects, persons, or the like, and this by way of education, information, or entertainment. Thus my improvement may be embodied in the form of a globular or other chart in size large enough to adapt it for school, lecture-room, or even more public purposes, and it may also, particularly in its globular or fractionally-globular form, be in size so diminutive as to adapt it to be used as a watch-charm, a souvenir, and the like.

The gist of my invention remains the same whatever the particular form of chart employed to embody it; but it is not considered essential to illustrate it in more than one form of embodiment, since any other possible form will be readily understood therefrom. The preferred form of embodiment, however, is that of a globe. Hence I so illustrate it in the accompanying drawings, in which—

Figure 1:
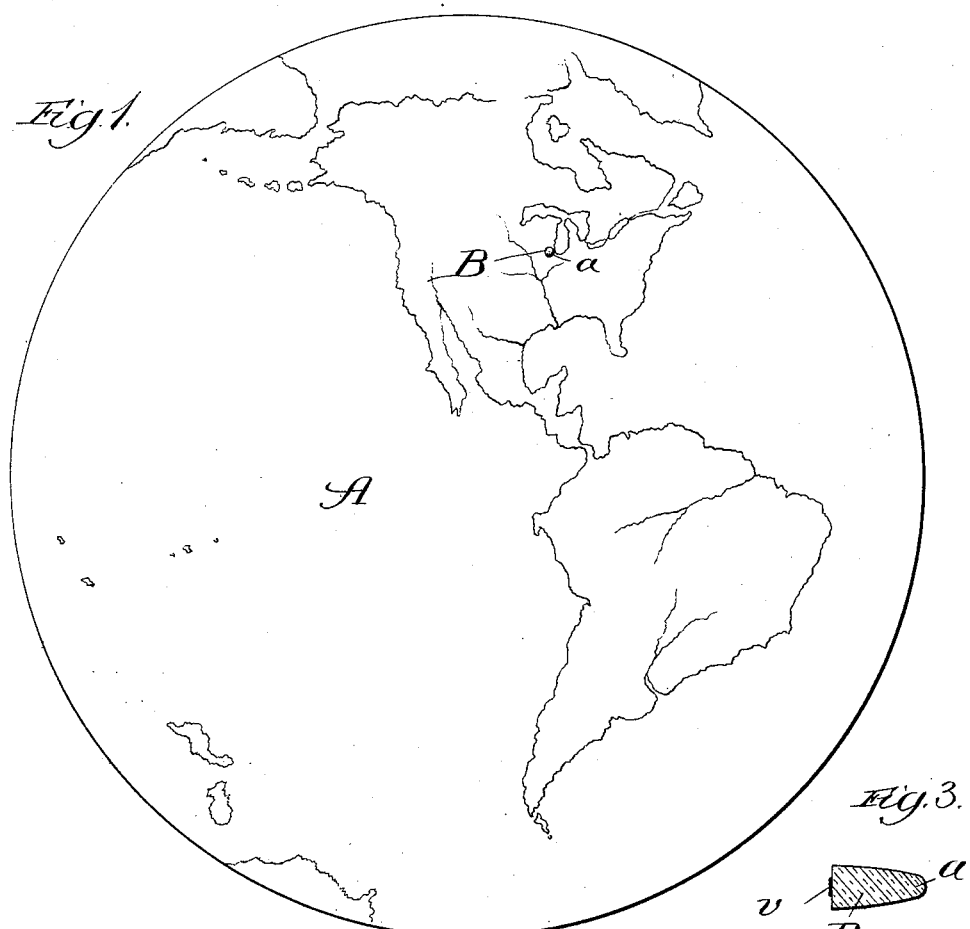
Figure 3:
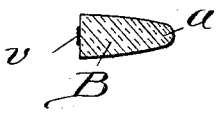
Figure 2:
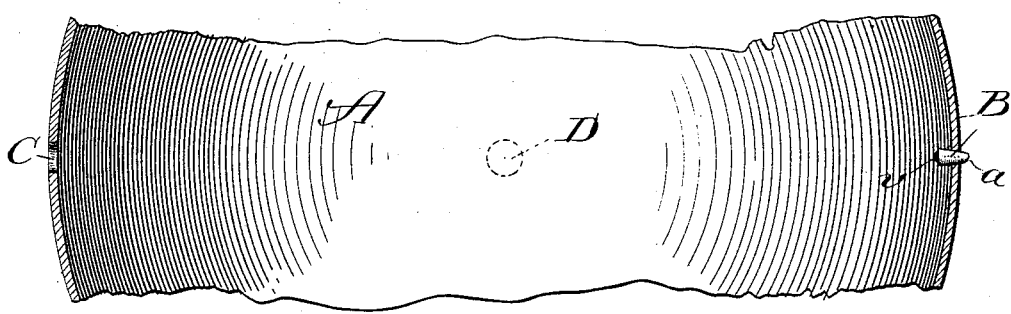

Figure 1 is a view in elevation of a terrestrial globe provided with my improvement. Fig. 2 is a view in broken sectional elevation of the same, showing by a dotted representation a modified means of illuminating the interior when the globe is of large size. Fig. 3 is a longitudinal sectional view of a lens suitable for my purpose.

A is a terrestrial globe provided at one point or any desired number of points with lenses B suitable for my purpose. The lens represented in the drawings is an ordinary magnifying-lens, with a pictorial or other representation applied to it, as indicated at $v$, whereby it will be observable in adequately-magnified form to the eye applied at $a$. The nature of the representation visible through the lens should be that of association with the particular locality at the point on the chart where the lens is inserted. Thus, for example, such representations would be plants or the like indigenous to a particular locality, fish in certain parts of the ocean, or a pictorial representation of a site, such as that of a world's fair. Other and perhaps better examples might be given; but the foregoing will serve by way of suggestion.

Where the chart is a hollow globe and of such small dimensions that adequate illumination of the interior may be afforded without artificial light within it, an opening C may be provided to admit light from without. In the larger sizes an artificial light D, and preferably incandescent electric light, should be supported inside the globe.

It is not necessary, though preferred, that the representation to be displayed through a lens shall be applied directly thereto, as it may without departing from the spirit of my invention be supported anywhere within proper visual range of the lens.

The particular manner of affixing the lens on a globe or other form of chart is not essential to my invention, though a convenient way is to insert it into and cement it in an opening, as represented.

What I claim as new, and desire to secure by Letters Patent, is—

1. In combination with a chart, a magnifying-lens affixed thereto at a desired point and a representation visible through said lens and in some way associated with the locality represented at the point of application of the lens, substantially as described.

2. In combination with a chart, a magnifying-lens affixed thereto at a desired point and a view upon the lens in some way associated with the locality represented at the point of application of the lens to the chart, substantially as described.

3. In combination with a globe A, a lens B, secured in an opening therein at a desired point, a suitable view observable through the lens in its position on the globe, and means for illuminating the interior of the globe, substantially as described.

4. In combination with a globe A, a lens B, secured in an opening therein at a desired point, a suitable view observable through the lens in its position on the globe, and an artificial light inside the globe, substantially as described.

5. In combination with a globe A, a lens B, secured in an opening therein at a desired point and provided with a view in some way associated with the locality represented at the point of application of the lens, and an artificial light inside the globe, substantially as described.

JONATHAN D. PRICE.

In presence of—
M. J. FROST,
J. N. HANSON.